(12) United States Patent
Chen et al.

(10) Patent No.: US 10,534,770 B2
(45) Date of Patent: Jan. 14, 2020

(54) PARALLELIZING SQL ON DISTRIBUTED FILE SYSTEMS

(71) Applicant: Hewlett Packard Enterprise Development LP, Houston, TX (US)

(72) Inventors: Qiming Chen, Cupertino, CA (US); Meichun Hsu, Los Altos Hills, CA (US); Maria G. Castellanos, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 274 days.

(21) Appl. No.: 15/114,328

(22) PCT Filed: Mar. 31, 2014

(86) PCT No.: PCT/US2014/032336
§ 371 (c)(1),
(2) Date: Jul. 26, 2016

(87) PCT Pub. No.: WO2015/152868
PCT Pub. Date: Oct. 8, 2015

(65) Prior Publication Data
US 2017/0011090 A1    Jan. 12, 2017

(51) Int. Cl.
*G06F 7/00* (2006.01)
*G06F 17/30* (2006.01)
*G06F 16/2453* (2019.01)
*G06F 16/182* (2019.01)
*G06F 16/2455* (2019.01)

(52) U.S. Cl.
CPC ...... *G06F 16/24532* (2019.01); *G06F 16/182* (2019.01); *G06F 16/2455* (2019.01); *G06F 16/2456* (2019.01); *G06F 16/24554* (2019.01)

(58) Field of Classification Search
CPC ......... G06F 17/30445; G06F 17/30477; G06F 17/30486; G06F 16/24532; G06F 16/182; G06F 16/2455; G06F 16/2456
(Continued)

(56) References Cited

U.S. PATENT DOCUMENTS 5,822,750 A    10/1998 Jou et al.
2004/0098359 A1    5/2004 Bayliss et al.
(Continued)

FOREIGN PATENT DOCUMENTS

WO    WO-2013139379    9/2013

OTHER PUBLICATIONS

"What's New in Base SAS 9.4 Details," SAS Institute Inc, Dec. 2013, http://support.sas.com/documentation/cdl/en/basewn/66496/PDF/default/basewn.pdf.
(Continued)

*Primary Examiner* — Md I Uddin

(57) ABSTRACT

Example embodiments relate to parallelizing structured query language (SQL) on distributed file systems. In example embodiments, a subquery of a distributed file system is received from a query engine, where the subquery is one of multiple subqueries that are scheduled to execute on a cluster of server nodes. At this stage, a user defined function that comprises local, role-based functionality is executed, where the partitioned magic table triggers parallel execution of the user defined function. The execution of the UDF determines a sequence number based on a quantity of the cluster of server nodes and retrieve nonconsecutive chunks from a file of the distributed file system, where each of the nonconsecutive chunks is offset by the sequence number.

14 Claims, 4 Drawing Sheets

(58) Field of Classification Search
USPC .. 707/634, 713, 822, 737, 999.001, 999.107
See application file for complete search history.

(56) References Cited

U.S. PATENT DOCUMENTS

| | | | |
|---|---|---|---|
| 2008/0059489 | A1 | 3/2008 | Ian et al. |
| 2011/0010296 | A1 | 1/2011 | Kemper et al. |
| 2011/0302151 | A1 | 12/2011 | Abad et al. |
| 2011/0302583 | A1 | 12/2011 | Abadi et al. |
| 2012/0130950 | A1 | 5/2012 | Jain et al. |
| 2012/0182891 | A1 | 7/2012 | Lee et al. |
| 2012/0310916 | A1 | 12/2012 | Abadi et al. |

OTHER PUBLICATIONS

Brust, "Big on Data: Microsoft's PolyBase mashes up SQL Server and Hadoop", posted online on Nov. 15, 2012, 15 pages. <https://www.zdnet.com/article/microsofts-polybase-mashes-up-sql-server-and-hadoop/>.

Cloudera, "Cloudera Enterprise Core", Oct. 26, 2012, 3 pages. <https://web.archive.org/web/20121026020402/http://www.cloudera.com/content/cloudera/en/products/cloudera-enterprise-core.html>.

Microsoft, "Gray Systems Lab: Polybase", retrieved from the Internet on Dec. 10, 2018, 2 pages. <http://gsl.azurewebsites.net/Projects/Polybase.aspx>.

Microsoft, "Parallel Data Warehouse", Jan. 4, 2012, 4 pages. <https://web.archive.org/web/20120104030055/http://www.microsoft.com/sqlserver/en/us/solutions-technologies/data-warehousing/pdw.aspx>.

Melnik et al., "Dremel: Interactive Analysis of Web-Scale Datasets", Proceedings of the VLDB Endowment, vol. 3, No. 1, 2010, 10 pages.

The Apache Software Foundation, "Apache Scoop", retrieved from the Internet on Dec. 10, 2018, 1 page. <http://sqoop.apache.org/>.

Vertica, retrieved from the Internet on Dec. 10, 2018, 11 pages. <https://www.vertica.com/>.

PARALLELIZING SQL ON DISTRIBUTED FILE SYSTEMS

BACKGROUND

Providing structured query language (SQL) access for distributed file systems (DFS) such as HADOOP® DFS is becoming more common in big-data management. Currently, SQL access is provided by building DFS-based SQL engines, loading data into relational database management systems (DBMS's) from DFS's, and storing relation tables in DFS's as external tables. In this case, the SQL engines read data from a DFS using table-scan. Further, a DFS file is an external data source that cannot provide a locality hint for parallelizing query execution. Accordingly, a master server is typically employed for gathering data source information and scheduling parallel data retrieval. HADOOP® is a registered trademark of Apache Software Foundation, which is headquartered in Forest Hill, Md.

BRIEF DESCRIPTION OF THE DRAWINGS

The following detailed description references the drawings, wherein.

DETAILED DESCRIPTION

As detailed above, typical queries of external DFS files are performed using table-scan (i.e., accessing the table directly) without support for parallel execution. In order to parallelize the retrieval of DFS data, a function-scan (i.e., accessing data via a UDF) may be used via a user defined function (UDF) to connect to DFS, thereby allowing (1) data to be retrieved/parsed in various formats, (2) relation tuples to be retrieved to feed the host query directly without first copying/materializing the data as stored tables, and (3) the data to be joined to tables in a local data source. Further, a role-based UDF design and UDF instance recognition may be applied that allows the running instances of a UDF to act differently and collaboratively in retrieving and processing data from multiple external sources. Based on the parameters provided to the UDF, a node can assign itself a roleID that is in turn used to logically divide chunks when retrieving data from a DFS file or from multiple external engines. The UDF instances divide their work according to their roles without relying on a "master server".

A query parallelizing technique may be provided sing a magic table that instructs the query engine to execute a UDF on multiple nodes for retrieving/analyzing the data from multiple sources in parallel. This technique allow for parallel query processing to be used for data integrated applications (e.g. obtain analytics results from multiple data layer engines or to aggregate the operational data from multiple operational databases) without modifying the query engine. The role-based UDF design and run-time peer UDF role resolution allow a single parallel query to handle various external data sources simultaneously. Further, the magic table may be generalized as a system support for parallelizing UDF execution.

Example embodiments disclosed herein provide parallelizing SQL on DFS's. In example embodiments, a subquery of a distributed file system is received from a query engine, where the subquery is one of multiple subqueries that are scheduled to execute on a cluster of server nodes. At this stage, a user defined function that comprises local, role-based functionality is executed, where the partitioned magic table triggers parallel execution of the user defined function. The execution of the UDF determines a sequence number based on a quantity of the cluster of server nodes and retrieve nonconsecutive chunks from a file of the distributed file system, where each of the nonconsecutive chunks is offset by the sequence number.

In this manner, example embodiments disclosed herein improve parallelizing SQL on DFS's by using a magic table that simulates parallelization metadata. At this stage, the DFS file can be accessed in parallel based on a role parameter provided to the UDF of each node, which then retrieves nonconsecutive chunks corresponding to the role parameter for combining with results of the other nodes.

Figure 1:
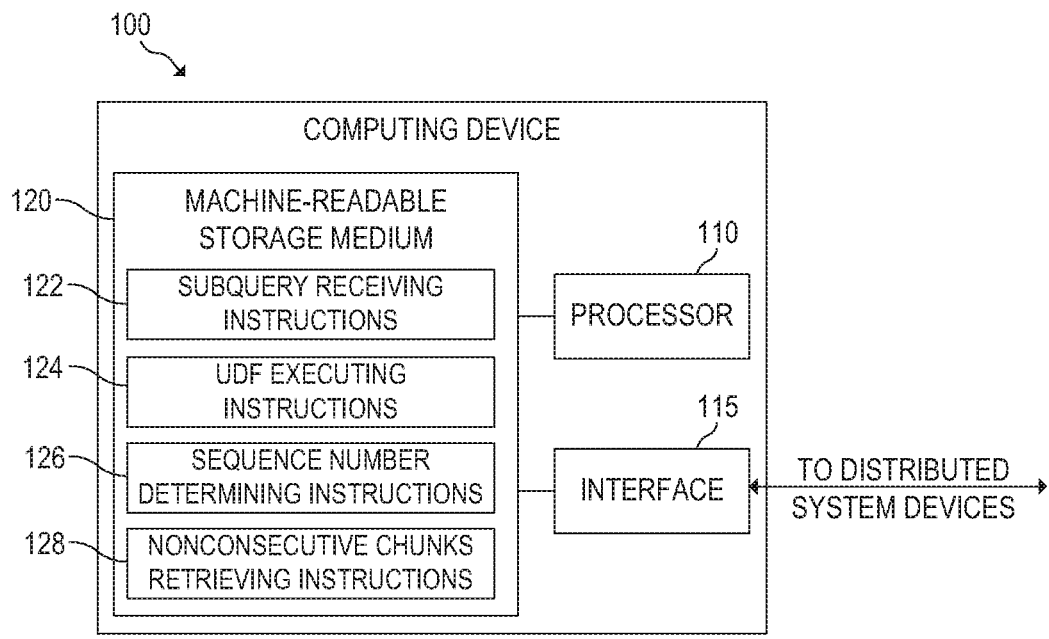
FIG. 1 is a block diagram of an example computing device for parallelizing SQL on a DFS.

Referring now to the drawings. FIG. 1 is a block diagram of an example computing device 100 for parallelizing SQL on a DFS. Computing device 100 may be any computing device (e.g., database server, distributed database, desktop computer, etc.) with access to a distributed database system. In the embodiment of FIG. 1, computing device 100 includes a processor 110, an interface 115, and a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126, 128 to parallelizing SQL on a DFS, as described below. As an alternative or in addition to retrieving and executing instructions, processor 110 may include one or more electronic circuits comprising a number of electronic components for performing the functionality of one or more of instructions 122, 124, 126, 128.

Interface 115 may include a number of electronic components for communicating with a distributed database system. For example, interface 115 may be an Ethernet interface, a Universal Serial Bus (USB) interface, an IEEE 1394 (Firewire) interface, an external Serial Advanced Technology Attachment (eSATA) interface, or any other physical connection interface suitable for communication with the distributed database system. Alternatively, interface 115 may be a wireless interface, such as a wireless local area network (WLAN) interface or a near-field communication (NFC) interface. In operation, as detailed below, interface 115 may be used to send and receive data to and from a corresponding interface(s) of the distributed database system.

Machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for parallelizing SQL on a DFS.

Subquery receiving instructions 122 receive a subquery from a query engine. The subquery is a query that is nested within a query, where the query engine has divided the query into subqueries that are sent to server nodes similar to and including computing device 100. In this example, each of the subqueries includes a magic number that can be used to determine how each of the subqueries should be executed as described below. In other words, the query engine processes and manages the execution of a query across server nodes in a database cluster by assigning each subquery to a particular server node such as computing device 100. The subquery requests data from a DFS file in a DFS that is accessible to computing device 100. With respect to the query engine, computing device 100 is considered an external source that lacks partition information that can be used to parallelize a query for a DFS file. An external source may be defined as a source of data that exists outside a database but is referenced such that the external source can be accessed as if it were a table of the database.

UDF executing instructions 124 execute a corresponding UDF using parameters in the subquery. Specifically, a magic number in the subquery is provided as a parameter to the UDF. Based on the magic number, the UDF can determine whether the subquery should be executed in parallel. The UDF uses the magic number to attempt to retrieve a magic tuple associated with computing device 100 from a partitioned magic table. The partitioned magic table is locally accessible to each server node in the database cluster, where each server node is associated with exactly one magic tuple in the partitioned magic table. If the magic tuple is retrieved from the partitioned magic table, the UDF executes and obtains chunks from the DFS file in parallel with the other server nodes. However, if the magic tuple is not retrieved from the partitioned magic table, the UDF does not attempt to retrieve chunks from the DFS file.

A role may be assigned to computing device 100 that determines the functionality of computing device's 100 UDF. Such a role-based UDF design is designed so that during parallel execution on multiple nodes, the execution instances on different server nodes can obtain different portions of a DFS file. In contrast when a parallel query executes on a typical partitioned DFS, the UDF instance executed on all nodes applies the same function to the DFS file.

Sequence number determining instructions 126 determine a sequence number to he used during the execution of the UDF. For example, the sequence number may be determined based on the number of nodes in the cluster and the magic number in the subquery. In another example, the sequence number may be determined based on the number of nodes in the cluster and a host name parameter provided in the subquery.

Nonconsecutive chunks retrieving instructions 128 retrieve nonconsecutive chunks from the DFS file based on the sequence number. Specifically, the sequence number is used to offset the nonconsecutive chunks that are retrieved. For example, if there are 4 nodes in the cluster and the sequence number is 0, the $1^{st}$, $5^{th}$, $9^{th}$, $13^{th}$, etc. chunks will be retrieved from the DFS file. In some cases, the size of each chunk retrieved can also be specified as a parameter in subquery.

Figure 2:
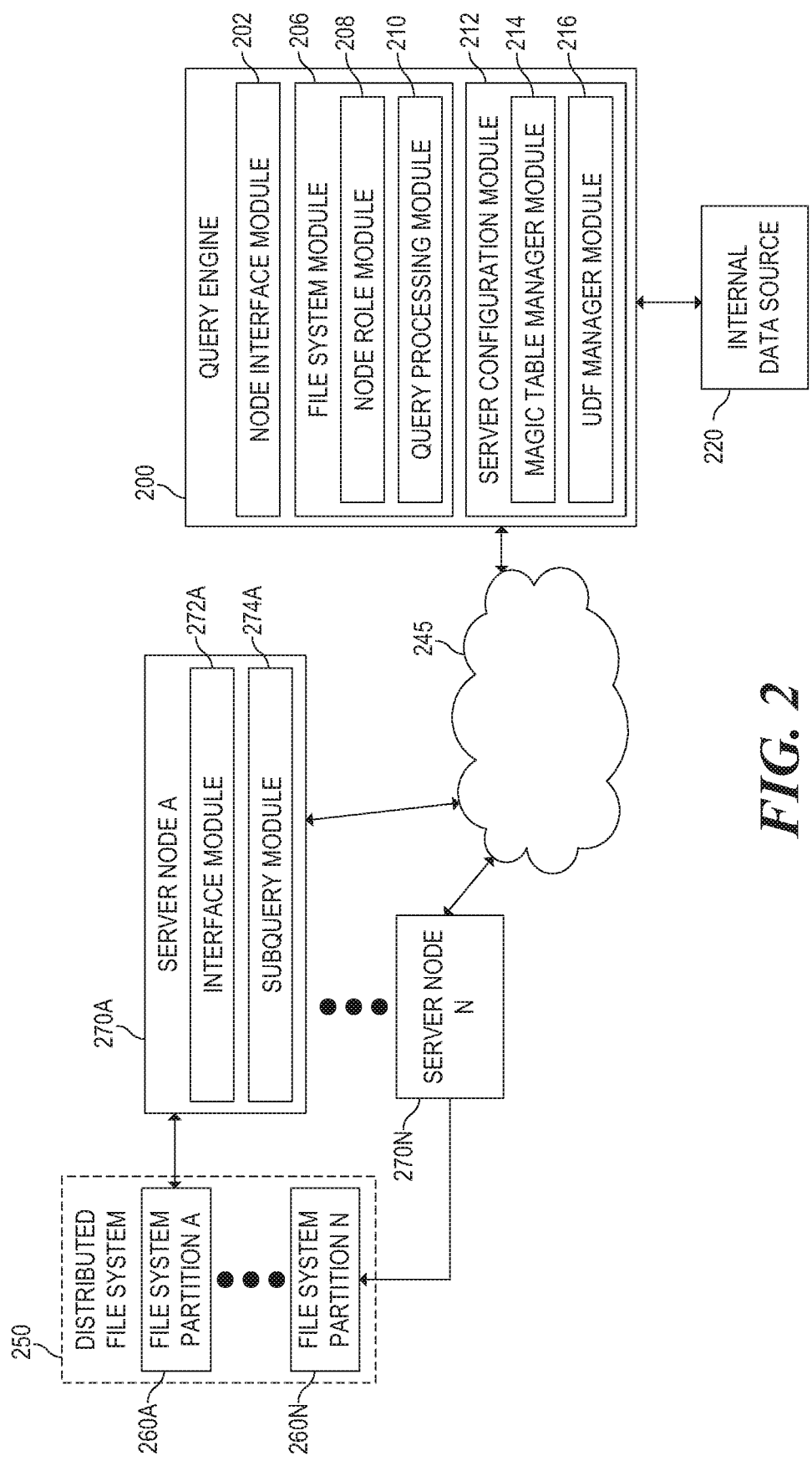
FIG. 2 is a block diagram of an example query engine in communication with server nodes for parallelizing SQL on a DFS.

FIG. 2 is a block diagram of an example query engine 200 in communication with server nodes 270A, 270N for parallelizing SQL on a DFS 250. As illustrated, query engine 200 may include a number of modules 202-216. Each of the modules may include a series of instructions encoded on a machine-readable storage medium and executable by a processor of the query engine 200. In addition or as an alternative, each module may include one or more hardware devices including electronic circuitry for implementing the functionality described below.

Similar to computing device 100 of FIG. 1, query engine 200 may be a server, a database server, a desktop computer, or any other device suitable for executing the functionality described below. As detailed below, query engine 200 may include a series of modules 202-216 for parallelizing SQL on a DFS.

Node interface module 202 may manage communications with the server nodes 270A, 270N. Specifically, the node interface module 202 may initiate connections with the server nodes 270A, 270N and then send subqueries and receive query results to/from the server nodes 270A, 270N.

File system module 206 may manage query requests of the DFS cluster, which includes server nodes 270A, 270N and DFS 250. While only two server nodes and corresponding file system partitions are shown in FIG. 2, any number of server nodes and corresponding distributed file system can be included in the DFS cluster. Further, although the components of file system module 206 are described in detail below, additional details regarding an example implementation of module 206 are provided above in connection with instructions 122 of FIG. 1 from the perspective of a server node.

Node role module 208 may be configured to identify the role of each of the server nodes 270A, 270N. Specifically, node role module 208 may identify the role provided by a server node's associated UDF so that subqueries may be appropriately allocated to the server nodes 270A, 270N as described below. The role of a server node can be determined using, for example, a partitioned magic table that includes a magic number for each of the server nodes 270A, 270N.

Query processing module 210 may process queries for execution on DFS 250. Query processing module 210 initially processes a query by dividing the query into subqueries. At this stage, query processing module 210 may use node role module 208 to determine which server node (e.g., server node A 270A, server node N 270N) should receive each of the subqueries. In this example, each of the subqueries is sent to the identified server node (e.g., server node A 270A, server node N 270N) for execution in parallel, where query processing module 210 has included a magic number associated with the identified server node in the subqueries. The magic numbers allow each of the server nodes (e.g., server node A 270A, server node N 270N) to execute the common UDF in parallel; however, each UDF provides a different set of nonconsecutive chunks from a DFS file in DFS 250. After results are received from all server node 270A, 270N, query processing module 210 can combine the results to generate a DFS file that satisfies the original query.

Server configuration module 212 may manage the magic tables and UDF's for the server nodes 270A, 270N. Magic table manager module 214 may be configured to create and manage magic tables for each of the server nodes 270A, 270N (i.e., managed a partitioned magic table across the server nodes). As described above, the partitioned magic table has a magic tuple with a magic number for each server node (e.g., server node A 270A, server node N 270N). Further, the local magic table of a server node (e.g., server node A 270A, server node N 270N) may only include the magic number associated with that server node. The local magic table of a server node is restricted to one magic tuple so that a magic number provided in a subquery by the database module 206 can determine whether the subquery is executed as a UDF on the server node.

Magic table manager module 214 may also be configured to allow an administrator to initially create and then modify the partitioned magic table. For example, the partitioned magic table may be modified if server nodes are added or removed from a database cluster. Historically, query engine 200 executes a query in parallel mode if the query is accessing a partitioned table. In this case, the query as well as the hosted UDF may be scheduled to have multiple running instances on multiple server nodes, which each apply the same function to their local file system partition; otherwise, the query by default is scheduled to run on a single server node. However, external data sources like DFS 250 do not provide relevant table partition indications to query engine 200; thus, the query as well as the hosted UDF is not parallelized in this case.

The partitioned magic table allows for parallelization by instructing the query engine to run the query as well as the hosted UDF in parallel. For example, the partitioned magic table may be created with the following SQL statement:
    create table MagicTable (magic integer PRIMARY KEY NOT NULL) segmented by hash(magic) all nodes;
In this example, MagicTable has only one attribute "magic" with integer type. For a parallel database with N server nodes, the partitioned magic table has N rows, where each row has one value. As discussed above, the rows are hash partitioned with one partition per server node, and each partition on a server node has exactly one row (i.e., one magic number). The magic numbers are selected using a heuristic formula to meet the above requirement. For example, a database system with four nodes has the magic numbers 0, 1, 3, and 4 another example, a database system with 16 nodes has the magic numbers 0, 1, 2, 3, 4, 5, 6, 7, 9, 10, 12, 19, 24, 25, 76, and 101. Once inserted and partitioned to multiple nodes, the partitioned magic table should not be updated unless the database system is reconfigured.

In these examples, the magic number does not participate in any computations and is easily projected out from the query result. The purpose of the magic number is to trigger query engine 200 to execute a query that links to external data sources in parallel.

UDF manager module 214 may be configured to create and manage role-base UDF's in the file system partitions 260A, 260N. As discussed above, each UDF satisfies a different role so that the corresponding server node (e.g., server node A 270A, server node N 270N) can obtain a different set of nonconsecutive chunks of a file stream in parallel. To achieve parallelization, a UDF with the same name and arguments is created in each file system partition, where the sequence number of each server node (e.g., server node A 270A, server node N 270N) determines which set of nonconsecutive chunks is retrieved by the server node.

UDF's can be configured for inter-nodes parallelism and intra-node parallelism. Inter-nodes parallelism indicates that the UDF instances, bound to the instances of their hosting subqueries, are executing on separate server nodes to take advantage of multiple computing devices. Intra-node parallelism indicates that the UDF, regardless of the hosting query, has multiple execution instances on a single computing device to take advantage of multi-cores. As described above, query engine 200 can parallelize a query of external data sources by simulating table partition indications using the partitioned magic table (i.e., the partitioned magic table triggers parallel execution of UDF's on the external data sources).

In this example, data retrieval is split based on a peer-aware UDF design and execution. A UDF (i.e., function-scan) may be implemented based on a sequence number, where the operation of the UDF may be parameterized or switched by the sequence number. At run-time, initially each peer UDF identifies itself by the local hostname (or host-IP) acquired by invoking, for example, getHostName( ) and reads in the hostnames list, $L_h$, of the cluster from the configure file of cluster installation. At this stage, the peer UDF assigns itself a sequence number as the index of its hostname in $L_h$. Given a four node system, the sequence number of a peer UDF could be 0, 1, 2 or 3 (i.e. if its hostname matches the ith name in $L_h$ its sequence number is i). The peer UDF selects its portion of work according to its sequence number. For instance, having the file logically segmented into chunks, peer 0 accesses chunks 0, 4, 8, and so on while peer 1 accesses chunks 1, 5, 9, and so on, etc. (i.e., the chunk k is retrieved by the peer UDF with a sequence number matching the modulo of k over N (k % N)). The UDF may also responsible for handling chunk offsets since the first and last records may not align with the chunk boundaries as described below with respect to FIG. 4.

In this manner, each peer UDF can work independently without knowing the total size of the input stream. The self-scheduled parallel UDF allows the peer-instances of the single UDF to retrieve different parts of a single DFS file in parallel without relying on a "master server" to maintain metadata related to the schema of each of the local file system partitions and to manage the parallel execution of the subqueries.

The above described configuration provides a template for all the executing instances of the UDF. During execution, a peer UDF instance will identify its role by obtaining a local host address and if a matched engine can be identified, perform its portion of the file stream retrieval. In this manner, multiple UDF instances operate in parallel by collaboratively retrieving the data from multiple external servers, which allows for data integrated analytics to be performed using a single parallel query. Generally, the role-based actions can be designed with a function that receives role-ID as an argument or has functionalities case-switched based on the role-ID.

Internal data source 220 may be a local database that is accessible to query engine 200. For example, internal data source 220 may be any hardware storage device for maintaining data accessible to computing device 200. For example, internal data source 220 may include one or more hard disk drives, solid state drives, tape drives, and/or any other storage devices. The storage devices may be located in computing device 200 and/or in another device in communication with computing device 200.

DFS 250 may be a distributed file system accessible to server nodes in a database cluster. In this case, DFS 250 includes multiple file system partitions 260A, 260N. Also, DFS 250 is shown as a dashed box because the file system partitions 260A, 260N are not co-located but rather may be members of a distributed database system. The file system partitions 260A, 260N are external sources that do not provide table partition information to query engine 200 because query engine 200 does not have access to metadata describing external sources. Further, DFS 250 may be implemented using storage devices similar to the examples described above with respect to internal data source 220.

Each file system partition 260A, 260N is associated with a corresponding server node 270A, 270N. In FIG. 2, server node A 270A shows modules 272A-278A, which also exist in server node N 270N but are not shown to simplify the figure. Interface module 272A may manage communications with query engine 200. Specifically, the interface module 272A may receive subqueries from query engine 200 and provide subquery results in response.

Subquery module 274A may manage handle subqueries received from query engine 200. Although the components of subquery module 206 are described in detail below, additional details regarding an example implementation of module 274A are provided above in connection with instructions 124 of FIG. 1.

Subquery module 274A processes queries received from query engine 200. Specifically, subquery module 274A may extract parameters from the subquery, which are then provided to a UDF. Subquery module 274A may then obtain subquery results from the UDF and provide them to query engine 200. When extracting the parameters from the subquery, subquery module 274A can use the magic number included in the subquery to determine whether the UDF should be executed. Alternatively, the determination of whether to execute may be in the UDF itself, which can initially use the magic number to determine if it should continue execution or return a null result.

Figure 3:
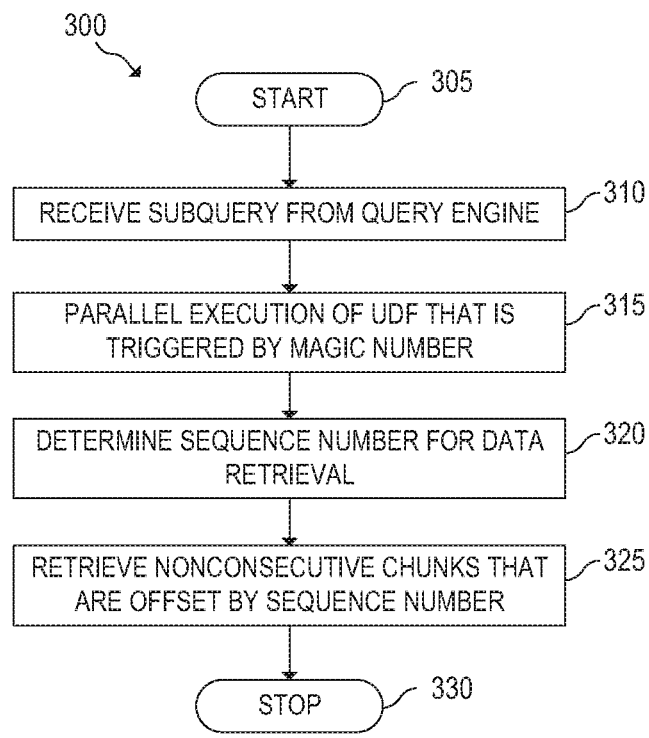
FIG. 3 is a flowchart of an example method for execution by a computing device for parallelizing SQL on a DFS.

FIG. 3 is a flowchart of an example method 300 for execution by a computing device 100 for parallelizing SQL on a DFS. Although execution of method 300 is described below with reference to computing device 100 of FIG. 1, other suitable devices for execution of method 300 may be used. Method 300 may be implemented in the form of executable instructions stored on a machine-readable storage medium, such as storage medium 120, and/or in the form of electronic circuitry.

Method 300 may start in block 305 and continue to block 310, where computing device 100 receive a subquery from a query engine. The subquery requests a file from a local file system partition of computing device 100, where the local file system partition is an external source of the query engine. Specifically, with respect to the query engine, computing device 100 is considered an external source that lacks partition information that can be used to parallelize a query of a partitioned table (i.e., computing device 100 does not include a partitioned table).

In block 315, a UDF associated with computing device 100 is executed using parameters in the subquery, which includes a magic number provided by the query engine. If the UDF is able to retrieve the magic tuple from the partitioned magic table using the magic number, the UDF executes and determines a sequence number for the retrieval of the file in block 320. The sequence number may be determined based on, for example, the magic number, a host name that is provided as a parameter, etc. In block 325, computing device 100 obtains nonconsecutive chunks of the file from its local file system partition in parallel with other server nodes, where the nonconsecutive chunks are offset by the sequence number. Method 300 may then continue to block 330, where method 300 may stop.

Figure 4:
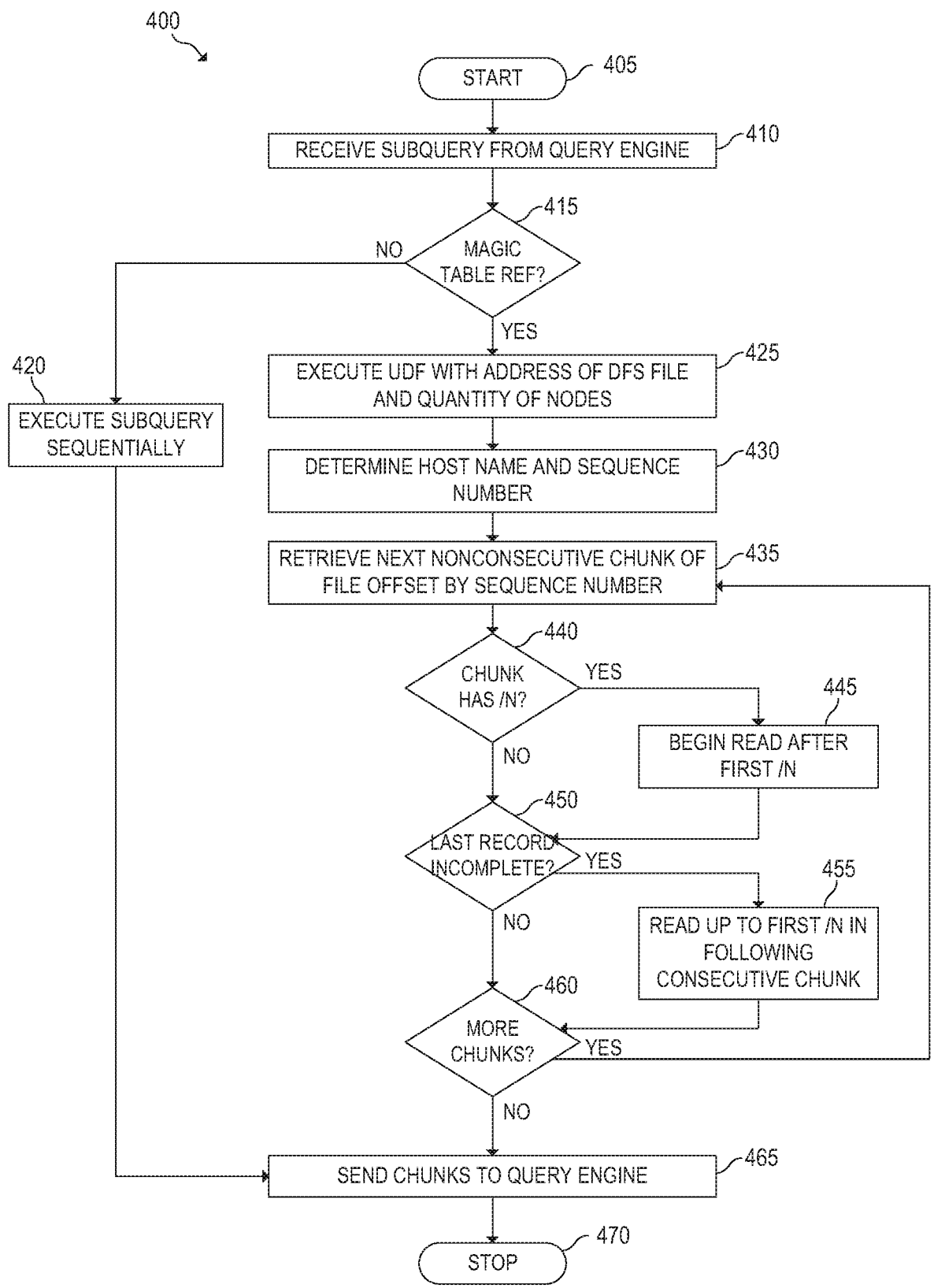
FIG. 4 is a flowchart of an example method for execution by a computing device for retrieving nonconsecutive chunks in a file stream of a DFS.

FIG. 4 is a flowchart of an example method 400 for execution by a computing device 100 for retrieving nonconsecutive chunks in a file stream of a DFS. Although execution of method 400 is described below with reference to computing device 100 of FIG. 1, other suitable devices for execution of method 400 may be used. Method 400 may be implemented in the form of executable instructions stored on a machine-readable storage medium and/or in the form of electronic circuitry.

Method 400 may start in block 405 and continue to block 410, where computing device 100 receive a subquery from a query engine that requests a DFS file from a local file system partition of computing device 100, where the local file system partition is an external source of the query engine. In block 415, computing device 100 determines if a magic table reference is included in the subquery. If a magic table reference is not included in the subquery, computing device 100 executes the subquery sequentially to retrieve the DFS file. In other words, the subquery is not executed in parallel to retrieve the DFS file, which is then sent to the query engine in block 465.

If a magic table reference is included in the subquery, computing device 100 executes a UDF with the address of the DFS file and a quantity of nodes in the database cluster as parameters in block 425. In this case, the database cluster includes computing device 100 and other server nodes with corresponding file system partitions for the same DFS. In block 430, computing device 100 determines its host name and sequence number (i.e., role identifier). The host name is a local name or address for identifying computing device 100 on a network.

In block 435, computing device 100 retrieves next nonconsecutive chunk of the DFS file as offset by the sequence number. For example, if the sequence number is 0 and the quantity of nodes is 4, computing device will initially retrieve chunk 0 and then chunk 4 when method returns to block 435 and so on. The chunks of the DFS file may not match data records included in the DFS file (i.e., each chunk may be smaller or larger than a whole number of records). Accordingly, each chunk retrieved by computing device 100 is analyzed as described below with respect to blocks 440-455 to handle misalignments in the chunks and records.

In block 440, computing device 100 determines if the retrieved chunk has a new line character. If the chuck has a new line character, computing device 100 beings reading the chunk after the first new line character in block 445. Otherwise, computing device 100 begins reading at the start of the chunk and proceeds to block 450. In block 450, computing device 100 determines whether the last record of the retrieved chunk is incomplete (i.e., does not end with a new line character). If the last record of the chunk is incomplete, computing device 100 continues to read into the next chunk until it finds the first new line character in the following consecutive chunk in block 455. Otherwise, computing device 100 reads to the end of the chunk and stops before proceeding to block 460.

In block 460, computing device 100 determines if there are more chunks of the DFS file to retrieve. If there are more chunks to retrieve, computing device returns to block 435 to retrieve the next chunk. If there are no more chunks to retrieve, computing device 100 sends the nonconsecutive chunks to query engine in block 465. Method 400 may then continue to block 470, where method 300 may stop.

While UDF abstraction simplifies the developer's effort, the function is still "user defined" rather than "system provided". As a result, the UDF is not general purposed but implementation specific. To make UDF's more user friendly, UDF development for known operation patterns CaO be provided as system functions. For example, a general-purposed Scan UDF applicable to any DFS text file can be provided.

In an implementation specific function if the data record is limited to comma separated values (CSV) where the fields are returned "as is", the function can be "system provided" for splitting CSV and returning fields "as is". In this case, input arguments and parameters (e.g., file URI) can be predefined. Further, the output schema (i.e., field names and types) should also be provided because (1) the output schema is indeed specific to different DFS files and (2) the output schema cannot be provided as a parameter since a UDF must be registered with the output schema before invoked.

The following dynamic schema approach can be used to define a general-purpose UDF with a given pattern (e.g. for retrieving DFS). In this example, the corresponding UDF class is not an abstract class but rather an actual class that can be used directly without further coding. The output schema of such a UDF may he a list of unnamed varchar fields with aliases c1, c2, etc. The field values of the external data record (e.g., implementation record) are mapped to return as strings such as a list of Strings with aliases c1, c2, etc.

Figure 5:
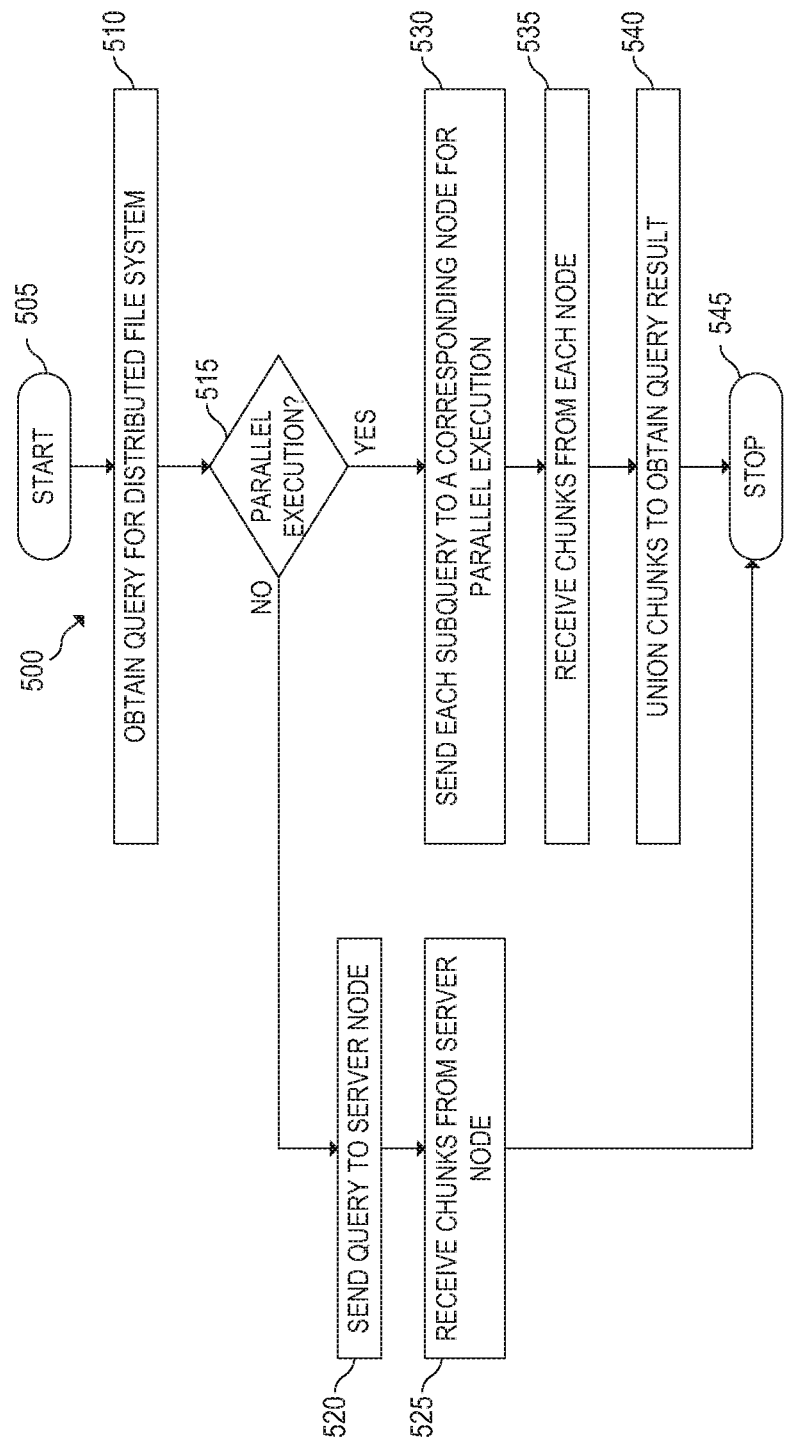
FIG. 5 is a flowchart of an example method for execution by a query engine for parallelizing SQL on a DFS.

In the host SQL query, the field values returned from the UDF can be renamed using "AS", and cast to non-strings using functions such as SQL TO_NUMBER( ), TO_DATE( ), TO_TIMESTAMP( ), etc. to fit in the other operators in the SQL query which consume the result of the UDF. Such an output schema is defined as "any-varchar(n, m)" where n is the varchar max length and m is the number of varchar fields. The specification may converted to a list of varchar types and registered with the corresponding factory class by a higher level abstract class as shown in the following example:

select c5 as xway, c6 as lane, AVG(to_pumber(c4)) as speed from (select hd_csv("using parameters file='hdfs://dbproduct.com:55555/data/hadoop/hours.txt',hosts=4) over(partition by magic) from Partitioner) f group by xway, lane;

In another example, the following UDF named cypher may be used to send a Cypher query to a graph database. In this example, the output of the function depends on the Cypher query. In order to make the output applicable to any Cypher query we have made it "general-purposed" based on the above dynamic schema mechanism. The UDF can then be invoked with a "dynamic schema" as shown below:

select c1 as title, to_number(c2) as release_year from (select cypher('Tom Hanks' using parameters servers='http://dbproduct.com:5555/db/data/', cypher='MATCH actor:Person {name: "% 1"})-[:ACTED_IN]→(movies) RETURN movies.title, movies.released as year') over ( )) f;

FIG. 5 is a flowchart of an example method 500 for execution by a query engine 200 for parallelizing SQL on a DFS. Although execution of method 500 is described below with reference to query engine 200 of FIG. 2, other suitable devices for execution of method 500 may be used. Method 500 may be implemented in the form of executable instructions stored on a machine-readable storage medium and/or in the form of electronic circuitry.

Method 500 may start in block 505 and continue to block 510, where query engine 200 obtains a query for a distributed database. For example, the distributed database may include both a local database and an external DFS, where the external DFS can include file system partitions that are clustered. In block 515, query engine 200 determines if parallel execution should be used for the query. Specifically, query engine may search for keywords that indicate that the query is using a partitioned magic table (e.g., "(partition by magic) FROM MagicTable"). If the query should not be executed in parallel, the query is sent to a server node in the typical fashion in block 520. The server node can then execute the query sequentially and provide the DFS file, which is received in block 525.

If this query should be executed in parallel, query engine 200 sends a subquery to each of the server nodes for execution in parallel in block 530. The subqueries are then used by the server nodes to obtain nonconsecutive chunks from a common UDF in parallel, where the nonconsecutive chunks are received from each server node by query engine in block 535. As described above, the common UDF provides role based functionality depending on a magic number that is returned from a partitioned magic table at each server node. In block 540, the nonconsecutive chunks from the server nodes are unioned and then provided to the requester as the DFS file. Method 500 then proceeds to block 545, where method 500 may stop.

The foregoing disclosure describes a number of example embodiments for parallelizing SQL on a DFS. In this manner, the embodiments disclosed herein enable parallel queries to be performed on external DFS sources by using a sequence number to obtain different sets of nonconsecutive chunks from each server node in a cluster in parallel.

We claim:

1. A first computing device for parallelizing structured query language (SQL) on distributed file systems, the first computing device comprising:
a processor; and
a memory storing instructions that when executed cause the processor to:
receive a subquery from a query engine that requests data stored in a local file system of the first computing device, wherein the subquery is one of a plurality of subqueries of a query that are sent from the query engine to a plurality of computing devices, including the first computing device, and scheduled to execute on the plurality of computing devices;
extract a parameter from the subquery;
execute a User Defined Function (UDF) using the extracted parameter to determine a reference number that references a partitioned table, wherein the partitioned table is created and maintained by the query engine and comprises a plurality of reference numbers that are used to trigger the plurality of computing devices to execute the subqueries in parallel, wherein the UDF works independently of other UDFs without knowing a total size of an input stream;
based on the reference number that references the partitioned table, execute the subquery in parallel with other computing devices of the plurality of computing devices;
determine a sequence number for the first computing device based on a quantity of the plurality of computing devices;
retrieve a plurality of nonconsecutive chunks from a file of the local file system of the first computing device, wherein each time one of the plurality of nonconsecutive chunks is retrieved from the file, the retrieved chunk is offset by the sequence number; and
send the nonconsecutive chunks from the first computing device to the query engine, wherein the nonconsecutive chunks from the first computing device are combined with chunks from the other computing devices and provided to a requester as a result of the query.

2. The first computing device of claim 1, wherein the instructions to cause the processor to retrieve the plurality of nonconsecutive chunks comprise instructions to cause the processor to:
in response to determining that a first chunk of the plurality of nonconsecutive chunks includes a first new line character, retrieve a portion of the first chunk that begins after the first new line character.

3. The first computing device of claim 2, wherein the instructions to cause the processor to retrieve the plurality of nonconsecutive chunks further comprise instructions to cause the processor to:
in response to determining that a second chunk of the plurality of nonconsecutive chunks ends with an incomplete record, retrieve a portion of a consecutive chunk that follows the second chunk, wherein the portion of the consecutive chunk ends at a second new line character.

4. The first computing device of claim 1, wherein a quantity of the reference numbers in the partitioned table equals the quantity of the plurality of computing devices.

5. The first computing device of claim 1, wherein the sequence number for the first computing device is further determined based on the reference number.

6. The first computing device of claim 1, wherein the computing devices are parts of a distributed file system and are external to the query engine.

7. A method for parallelizing structured query language (SQL) on distributed file systems, the method comprising:
creating, by a processor of a query engine, a partitioned table to include a plurality of reference numbers, wherein the reference numbers are used to cause a plurality of computing devices in a distributed file system to execute in parallel with each other;
dividing, by the processor of the query engine, a query into a plurality of subqueries, wherein each of the plurality of subqueries includes one of the reference numbers from the partitioned table, wherein the partitioned table simulates partition metadata for parallelizing execution of the plurality of subqueries on the plurality of computing devices;
sending, by the processor, the plurality of subqueries to the plurality of computing devices, wherein the plurality of computing devices are to extract parameters from the plurality of subqueries, execute User Defined Functions (UDFs) using the extracted parameters to determine the reference numbers wherein the UDFs work independently of each other without knowing a total size of an input stream, execute the plurality of subqueries in parallel based on the reference numbers, retrieve a plurality of nonconsecutive chunks from local file systems of the respective computing devices, and send the nonconsecutive chunks to the query engine, wherein the nonconsecutive chunks are offset by a sequence number; and
in response to receiving the plurality of chunks from the plurality of computing devices, combining, by the processor of the query engine, the plurality of chunks into a query result of the query.

8. The method of claim 7, wherein a quantity of the reference numbers in the partitioned table equals a quantity of the plurality of computing devices.

9. The method of claim 7, wherein the sequence number is determined based on the reference numbers and a quantity of plurality of computing devices.

10. The method of claim 7, wherein the plurality of computing devices are external to the query engine.

11. A non-transitory machine-readable storage medium storing instructions executable by a processor of a first computing device to cause the first computing device to:
receive a subquery from a query engine that requests data stored in a local file system of the first computing device, wherein the subquery is one of a plurality of subqueries of a query that are sent from the query engine to a plurality of computing devices, including the first computing device, and scheduled to execute on the plurality of computing devices;
extract a parameter from the subquery;
execute a User Defined Function (UDF) using the extracted parameter to determine a reference number that references a partitioned table, wherein the partitioned table is created and maintained by the query engine and comprises a plurality of reference numbers that are used to trigger the plurality of computing devices to execute the subqueries in parallel, wherein the UDF works independently of other UDFs without knowing a total size of an input stream;
based on the reference number that references the partitioned table, execute the subquery in parallel with other computing devices of the plurality of computing devices;
determine a sequence number based on the reference number and a quantity of the plurality of computing devices;
retrieve a plurality of nonconsecutive chunks from a file in the local file system of the first computing device, wherein each of the plurality of nonconsecutive chunks is offset by the sequence number; and
send the nonconsecutive chunks from the first computing device to the query engine, wherein the nonconsecutive chunks from the first computing device are combined with chunks from the other computing devices and provided to a requester as a result of the query.

12. The non-transitory machine-readable storage medium of claim 11, wherein the instructions to cause the first computing device to retrieve the plurality of nonconsecutive chunks:
in response to determining that a first chunk of the plurality of nonconsecutive chunks includes a first new line character, retrieve a portion of the first chunk that begins after the first new line character.

13. The non-transitory machine-readable storage medium of claim 12, wherein the instructions to cause the first computing device to retrieve the plurality of nonconsecutive chunks further comprise instructions to cause the first computing device to:
in response to determining that a second chunk of the plurality of nonconsecutive chunks ends with an incomplete record, retrieve a portion of a consecutive chunk that follows the second chunk, wherein the portion of the consecutive chunk ends at a second new line character.

14. The non-transitory machine-readable storage medium of claim 11, wherein the computing devices in the distributed file system are external to the query engine.

* * * * *